United States Patent [19]

Saka

[11] Patent Number: 4,923,183
[45] Date of Patent: May 8, 1990

[54] NON-CIRCULAR CROSS-SECTION COIL SPRING

[75] Inventor: Tsutomu Saka, Utsunomiya, Japan

[73] Assignee: Honda Giken Kogyo Kabushiki Kaisha, Tokyo, Japan

[21] Appl. No.: 258,746

[22] Filed: Oct. 17, 1988

[30] Foreign Application Priority Data

Oct. 20, 1987 [JP] Japan .............................. 62-262743
Nov. 16, 1987 [JP] Japan .............................. 62-287522

[51] Int. Cl.⁵ .............................................. F16F 1/06
[52] U.S. Cl. .................................... 267/180; 267/167
[58] Field of Search ............... 267/180, 166, 167, 70, 267/71, 69, 73, 74, 286, 287, 248, 4, 170, 171, 174; 140/103

[56] References Cited

U.S. PATENT DOCUMENTS

| | | | |
|---|---|---|---|
| 2,998,242 | 8/1961 | Schwarzbeck et al. | 267/166 |
| 3,727,901 | 4/1973 | Textrom | 267/168 |
| 4,735,403 | 4/1988 | Matsumoto et al. | 267/180 |

FOREIGN PATENT DOCUMENTS

| | | | |
|---|---|---|---|
| 0143515 | 6/1985 | European Pat. Off. | 267/166 |
| 2923270 | 12/1980 | Fed. Rep. of Germany. | |
| 273261 | 8/1952 | Japan. | |
| 0072931 | 6/1980 | Japan | 267/286 |
| 59-190528 | 10/1984 | Japan. | |
| 0190528 | 10/1984 | Japan | 267/166 |
| 0205034 | 11/1984 | Japan | 267/166 |
| 59-205034 | 11/1984 | Japan. | |
| 60-69337 | 4/1985 | Japan. | |
| 60-241535 | 11/1985 | Japan. | |
| 0167727 | 7/1986 | Japan | 267/286 |
| 0167728 | 7/1986 | Japan | 267/286 |
| 0017436 | 1/1987 | Japan | 267/167 |
| 0251537 | 11/1987 | Japan | 267/180 |

Primary Examiner—Andres Kashnikow
Assistant Examiner—Mark T. Le
Attorney, Agent, or Firm—Armstrong, Nikaido, Marmelstein, Kubovcik & Murray

[57] ABSTRACT

A non-circular cross-section coil spring, wherein a spring wire having a non-circular cross-section shape is coiled into such configuration that a major diameter of the cross-section is directed in the direction intersecting with a center line of the spring. Torsion is preliminarily given to at least a part of the spring wire so that the coil spring inner circumferential surface side of the above-mentioned major diameter may be deviated to a free end side of the spring with reference to the reference plane of extension and contraction of the coil spring in the case where the coil spring is a compression coil spring, but to the side of the aforementioned reference plane of extension and contraction in the case where the coil spring is a tension coil spring. In a coil spring comprising a larger pitch portion and a smaller pitch portion, a large angle of torsion is preliminarily given to the larger pitch portion and a small angle of torsion is preliminarily given to the smaller pitch portion. Upon application of a load, an angle of torsion of the spring wire becomes zero or nearly zero, thereby increase of the maximum shearing stress generated at the inner circumference of the coil spring can be suppressed, and also sharing stress in the spring wire can be made uniform.

4 Claims, 9 Drawing Sheets

NON-CIRCULAR CROSS-SECTION COIL SPRING

BACKGROUND OF THE INVENTION

The present invention relates to a coil spring formed by coiling a spring wire having a non-circular cross-section into a helical shape.

Figure 1:
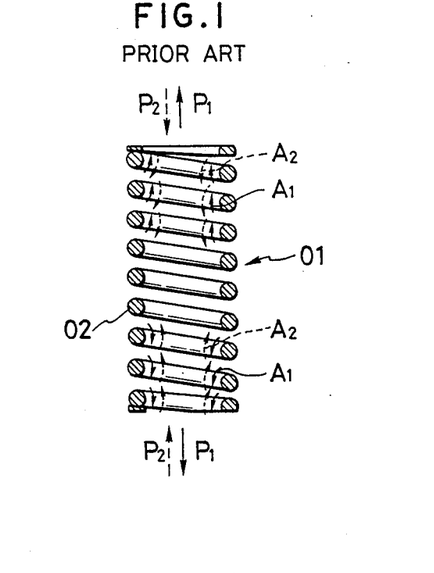
FIG. 1 is a longitudinal cross-section view of a known coil spring made of a spring wire having a circular cross-section.

A commonly used coil spring 01 (FIG. 1) is a spring formed by coiling a spring wire 02 having a circular cross-section into a spiral shape. When an axial tension load $P_1$ is exerted upon this coil spring 01, a torsion shearing stress in the direction shown by arrows $A_1$ is generated in the spring wire 02, and when an axial compression load $P_2$ is exerted, a torsion shearing stress in the direction shown by arrows $A_2$ is generated. Due to the fact that the spring wire 02 is curved, this torsion shearing stress becomes maximum at the inner circumference of the coil. In this connection, the maximum shearing stress ($\tau_{max}$) composed of this maximum shearing stress generated by torsion and the direct shearing stress generated by the axial load P, is represented by the following formula:

$$\tau_{max} = 8DP/nd^3\{(4C-1)/(4C-4) + 0.615/C\}$$

where D represents an average diameter of the coil, d represents a diameter of the spring wire, and C (=D/d) represents a spring index.

Due to the fact that this maximum shearing stress ($\pi_{max}$) is generated at the inner circumference of the coil, when an excessive repeated load is exerted upon the coil spring 01, there is a tendency that cracks may be generated in the spring wire 02 at the inner circumference of the coil. In order to obviate this shortcoming, there has been proposed a coil spring 03 (FIG. 2) formed by modifying a cross-section of a spring wire 04 into an oval shape and coiling the spring wire 04 with a major diameter 05 of the oval directed in the direction transverse to a center line L of the spring (Japanese Utility Model publication No. 27-3261 (1952)). In this coil spring 03, shearing stresses at the inner and outer circumferences, respectively, of the coil under action of an axial load are small at the inner circumference and large at the outer circumference as compared to those in a coil spring formed of a spring wire having a circular cross-section with a diameter equal to a minor diameter 06 of the spring wire 04, and moreover, owing to reduction of the maximum shearing stress ($\tau_{max}$) at the inner circumference of the coil, a difference between the shearing stresses at the inner and outer circumferences becomes small. Therefore, an energy efficiency of a spring can be improved, and a scope of use is enlarged.

Figure 2:
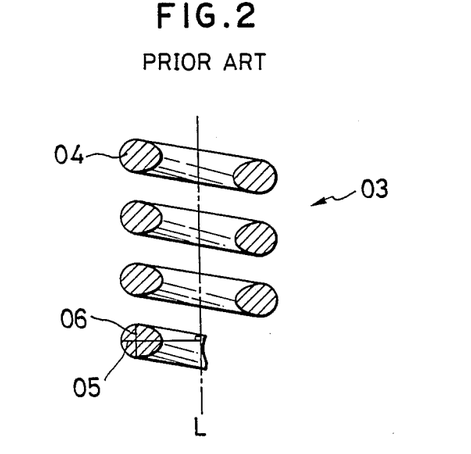
FIG. 2 and 3, respectively, are partial longitudinal cross-section views showing known coil springs made of spring wires having an oval cross-section.
Figure 3:
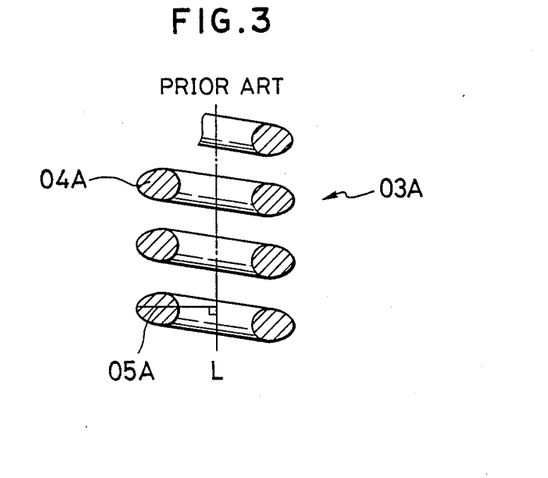

However, in the spring wire 04 of the coil spring 03, due to the fact that a radius of curvature at the inner circumferential portion of the coil is small, stress distribution on the peripheral surface of the spring wire is uneven, and upon the coiling work it was considered difficult to coil the spring wire in such manner that the extension line of the major diameter 05 of the spring wire 04 may intersect with the center line L at right angles. In order to obviate this shortcoming, there has been proposed a coil spring 03A, in which the side having a small radius of curvature of the spring wire 04A of oval shape in cross-section is directed towards the outer circumference of the coil (Laid-Open Japanese Patent Specification No. 60-69337 (1985)).

Even in the case of employing such spring wire 04A of oval shape in cross-section, if the coiling work is carried out simply in the conventional manner, torsion would be naturally generated in the spring wire 04A, and the extension line of the major diameter 05A would not become perpendicular to the center line L. However, here it is assumed that the coil spring 03A shown in FIG. 4 in which the extension line of the major diameter 05A intersects with the center line L at right angles, has been produced. In this case, if an axial load in the direction of compression is applied to the coil spring 03A, then torsional forces in the direction shown by arrows B are exerted upon the spring wire 04A in this figure, reference character S designates a reference plane of extension and contraction, and the spring wire 04A would be twisted depending upon the magnitude of the applied forces, resulting in increase of the maximum shearing stress ($\tau_{max}$) under the loaded condition. Whereas, if the axial load is applied in the tensional direction, the torsion of the spring wire 04A would be generated in the opposite direction (in the direction shown by arrows C).

Figure 5:
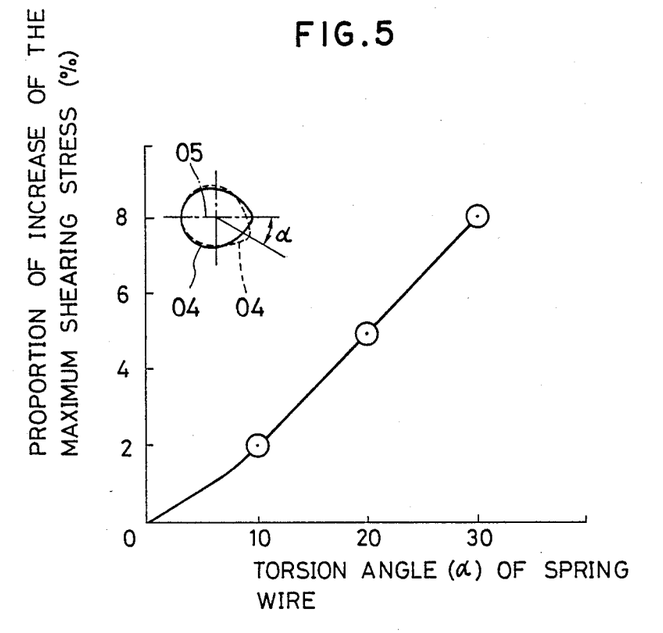
FIG. 5 is a diagram showing a relation between an angle of torsion ($\alpha$) of a spring wire generated upon coiling and a proportion of increase of the maximum shearing stress (%)

In practice, if coiling is carried out in a simple manner as described above, the coil springs 03 and 03A both have a tendency that torsion in the direction shown by arrows B would be naturally generated. FIG. 5 is a diagram showing influences of the naturally generated torsion upon the maximum shearing stress with respect to the coil spring 03, the abscissa representing a torsion angle ($\alpha$) of the spring wire, and the ordinate represents a proportion of increase of the maximum shearing stress (%). In the upper portion of FIG. 5 is shown by dash lines the condition where the spring wire 04 of the coil spring 03 has been twisted by an angle ($\alpha$) from a target coiled attitude (an attitude having the extension of the major diameter 05 intersected at right angles with the center line L as shown by solid lines), that is, the condition where torsion has been naturally generated as a result of the conventional coiling. As will be seen from this figure, if the torsion angle ($\alpha$) becomes large, the maximum shearing stress ($\tau_{max}$) generated at the inner circumference of the coil spring 03 would be increased.

The direction of this naturally generated torsion is an unfavorable direction for a compression coil, but is a favorable direction for a tension coil. More particularly, in a compression coil, when a compression load that is a load in use is exerted thereupon, a spring wire would be twisted up to a far larger angle than the above-mentioned naturally generated torsion, but in a tension coil, when a tension load that is a load in use is exerted thereupon, the above-mentioned naturally generated torsion would be restored.

Here, what is to be kept in mind is that in the case where a pitch of a coil spring is not uniform over its entire length but the coil spring consists of a larger pitch portion and a smaller pitch portion, the torsion generated by application of a load is different between the large pitch portion and the small pitch portion, and a torsion angle of the large pitch portion is smaller than a torsion angle of the small pitch portion.

SUMMARY OF THE INVENTION

The present invention has been worked out under the above-mentioned technical background, and has it as an object to provide a non-circular cross-section coil spring in which when a load in use has been applied thereto, increase of the maximum shearing stress generated at the inner circumference of the coil spring is suppressed, and also shearing stresses generated in a spring wire are made uniform.

It is to be noted that the above-mentioned "load in use" implies a compression load if the coil spring is a compression coil spring, but it implies a tension load if the coil spring is a tension coil spring.

In order to achieve the aforementioned objects, according to the present invention, there is provided a non-circular cross-section coil spring in which a spring wire having a non-circular cross-section shape is coiled into such configuration that a major diameter of the cross-section is directed in the direction intersecting with a center line of the spring, characterized in that torsion is preliminarily given to at least a part of the spring wire so that the coil spring inner circumferential surface side of the aforementioned major diameter may be deviated to the opposite side to the direction of application of a load in use with reference to the reference plane of extension and contraction of the coil spring.

Figure 4:
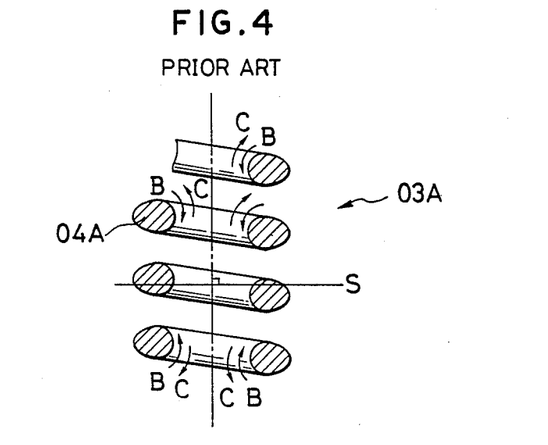
FIG. 4 is a partial longitudinal cross-section view showing direction of torsional forces exerted upon a spring wire when an axial load is applied to the coil spring in FIG. 3.

When a compression load has been applied to a coil spring, torsional forces as shown by arrows B in FIG. 4 are exerted upon the spring wire, but when a tension load has been applied thereto, torsional forces as shown by arrows C in FIG. 4 are exerted upon the spring wire, and the spring wire is twisted in the respective directions. However, according to the present invention, since such torsion that the coil spring inner circumference side of the major diameter of the spring wire cross-section may be deviated on the opposite side to the direction of application of the above-mentioned compression load or tension load, that is, the load in use, with reference to the reference plane of extension and contraction of the coil spring, is preliminarily given to the spring wire, by appropriately selecting this torsional angle, a torsional angle of the spring wire upon application of a load can be made zero or nearly zero, and increase of the maximum shearing stress ($\tau_{max}$) generated at the inner circumference of the coil spring can be suppressed.

Also, according to the present invention, there is provided a non-circular cross-section coil spring having a larger pitch portion and a smaller pitch portion in which a spring wire having a non-circular cross-section shape is coiled into such configuration that a major diameter of the cross-section is directed in the direction intersecting with a center line of the spring, characterized in that a torsion is preliminarily given to at least a part of the spring wire so that the coil spring inner circumferential surface side of the aforementioned major diameter may be deviated to the opposite side to the direction of application of a load in use with reference to the reference plane of extension and contraction of the coil spring, and the angle of the above-mentioned torsion is larger in the larger pitch portion as compared to that in the smaller pitch portion.

Since when a load is applied to a coil spring having a larger pitch portion and a smaller pitch portion a larger torsion is generated in the spring wire in the larger pitch portion than in the smaller pitch portion, if the angle of torsion preliminarily given to the larger pitch portion is made larger than the angle of torsion preliminarily given to the smaller pitch portion as described above, then under a loaded condition the angle of torsion in the spring wire is made uniform along the lengthwise direction of the coil spring, and thereby shearing stresses generated in the coil wire are also made uniform. Furthermore, as described above, by reducing the angle of torsion of the spring wire upon loading to zero or to nearly zero, increase of the maximum shearing stress ($\tau_{max}$) generated at the inner circumference of the coil spring can be suppressed.

DETAILED DESCRIPTION OF THE PREFERRED EMBODIMENTS

At first, description will be made on a process for making a non-circular cross-section compression coil spring according to the present invention (FIG. 6 to 11).

Figure 6:
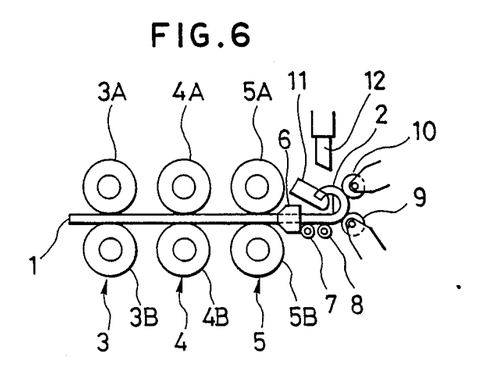
FIG. 6 is a schematic view showing a manufacturing device of the non-circular cross-section coil spring according to the present invention.
Figure 7:
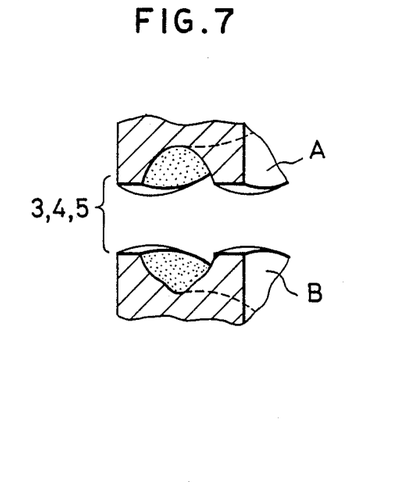
FIG. 7 is a perspective view showing a part of a feed roller pair in the manufacturing device in FIG. 6 as cut along diameters.
Figure 8:
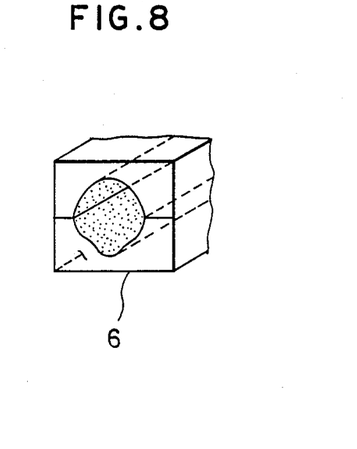
FIG. 8 is a perspective view showing wire guide dies in the same manufacturing device.
Figure 9:
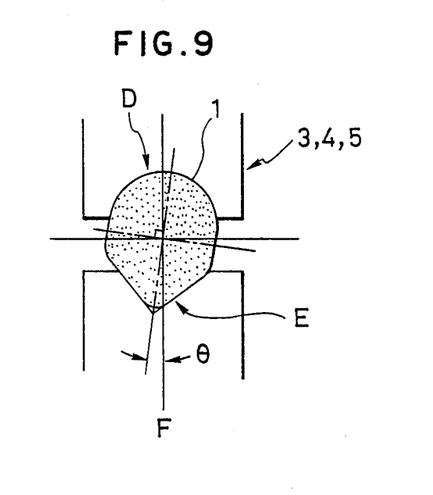
FIGS. 9 and 10, respectively, are schematic views showing relations between groove configurations of the feed roller pair and a wire material.

FIG. 6 shows the state where a raw material wire (spring wire) 1 is fed through wire guide dies 6 and guide rollers 7 and 8 to coiling rolls 9 and 10 by means of a plurality of feed roller pairs 3(3A, 3B), 4(4A, 4B) and 5(5A, 5B) to be given with a predetermined curved configuration, and it is given with a predetermined pitch by a pitch controlling tool 11 to be formed into a compression coil spring 2. Reference numeral 12 designates a cutter for cutting the coil spring into a predetermined length. The cross-section shape of the raw material wire 1 is shown in FIG. 9, a portion D of the cross-section is formed into a coil inner circumferential surface, and a portion E thereof is formed into a coil outer circumferential surface. In correspondence to the cross-section shape of the raw material wire 1, the grooves of the respective feed roller pairs 3, 4 and 5 and the die hole of the wire guide dies 6 are formed in the same shape (FIGS. 7 and 8). The grooves of the guide rollers 7 and 8 and the grooves of the coiling rolls 9 and 10 are formed in the same shape as the groove of one roller B in FIG. 7.

Figure 10:
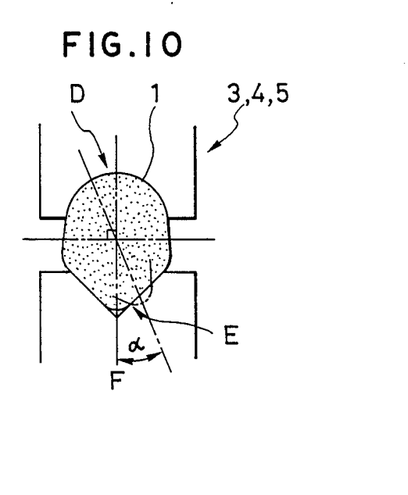
Figure 11:
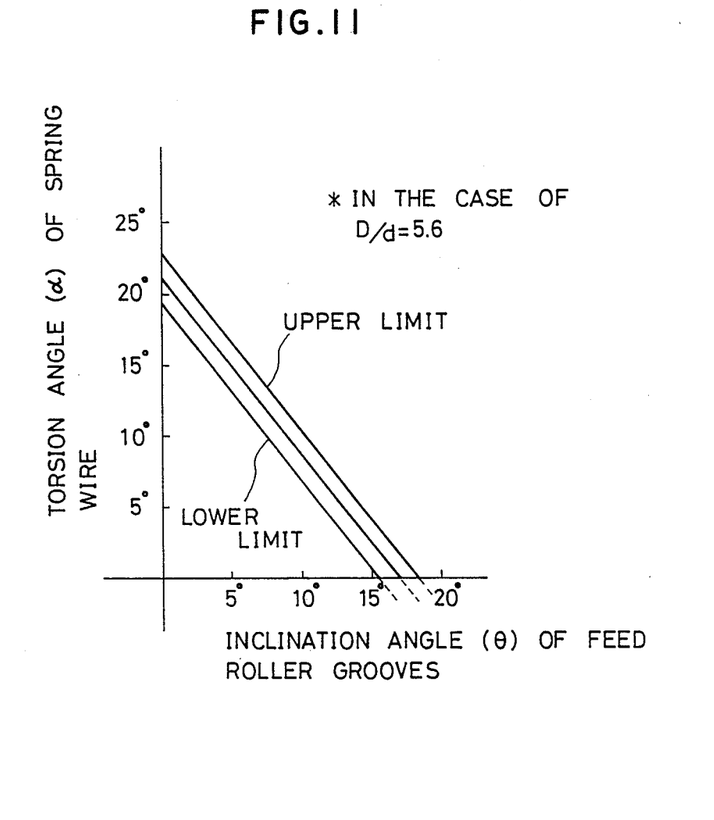
FIG. 11 is a diagram showing relations between an inclination angle ($\theta$) of a feed roller groove and an angle of torsion of a coiled spring wire.

As shown in FIG. 9, the grooves of the respective feed roller pairs 3, 4 and 5 are formed in such manner that the major diameter of the raw material wire 1 may be inclined by an angle ($\theta$) from the plane F which would intersect at right angles with the center line of the compression coil spring 2 during the coiling process. Assuming that the angle ($\theta$) is zero as shown in FIG. 10, then as described previously an angle of torsion ($\alpha$) is generated in the spring wire of the formed coil spring 2. That is, the portion D of the raw material wire 1 is not directed correctly toward the center of the spring. FIG. 11 is a diagram showing a relation between the above-mentioned angle of torsion ($\alpha$) per meter of the spring wire 1 and the inclination angle ($\theta$) of the feed roller grooves with respect to a coil spring having D/d of 5.6, and in this coil spring, if the angle ($\theta$) is chosen to be zero as shown in FIG. 10, then the angle of torsion ($\alpha$) of the spring wire becomes about 21°/m.

As will be seen from FIG. 11, as the inclination angle ($\theta$) of the feed roller grooves becomes large, the angle of torsion of the spring wire of the coil spring 2 would become small. And if the inclination angle ($\theta$) is made sufficiently large, the angle of torsion ($\alpha$) can be made even minus as shown by dash lines in FIG. 11. In other words, it is possible to give the spring wire a torsion of the opposite direction to the angle of torsion generated in the case of the conventional coiling. Accordingly, by appropriately selecting the inclination angle ($\theta$) of the feed roller grooves depending upon a coil pitch and a spring index (C=D/d), a desired angle of torsion can be given to the spring wire of the coil spring 2. A number of examples of the coil spring according to the present invention which have been produced in the above-described manner, are shown in FIGS. 12 to 14.

Figure 12:
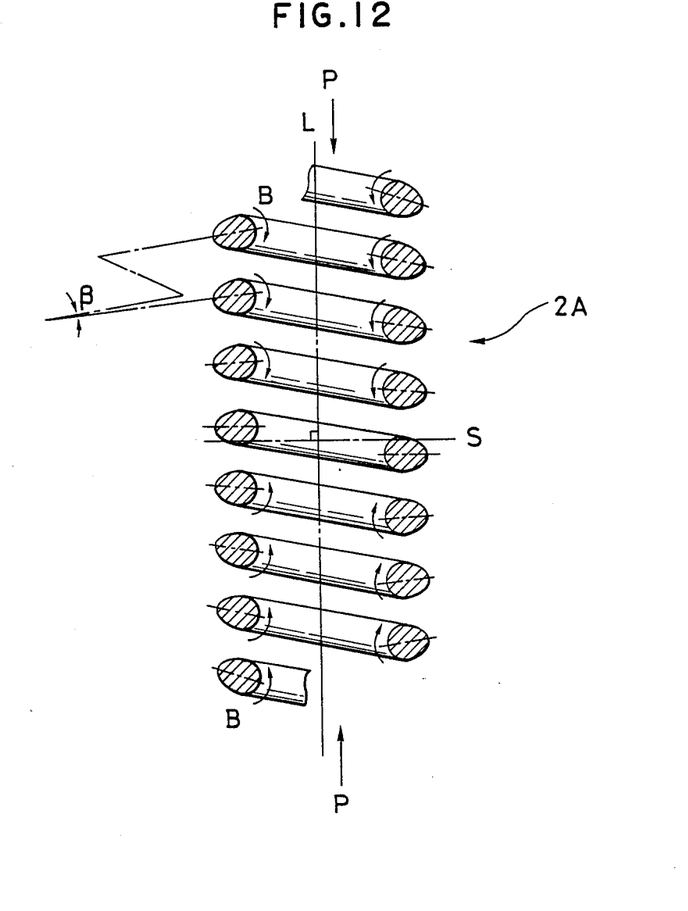
FIG. 12 is a partial longitudinal cross-section view showing a compression spring according to one preferred embodiment of the present invention.

A coil spring 2A shown in FIG. 12 is a compression spring having an equal pitch over its entire length, and it is shown under an unloaded condition. In this compression spring 2A, a coil spring inner circumferential surface side of the major diameter of the cross-section of the spring wire is deviated towards the free end side of the spring with reference to the extension/contraction reference plane S (an imaginary plane indicating the position where torsion is not generated in the spring wire upon application of an axial load). Reference character $\beta$ designates an angle of torsion per one pitch. When an axial compression load P is applied to the compression coil spring 2A, torsional forces in the directions indicated by arrows B are exerted upon the spring wire, and the angle of torsion $\beta$ becomes zero or nearly zero. Therefore, the maximum shearing stress generated at the inner circumferential surface of the coil upon application of a load can be sufficiently reduced.

Figure 13:
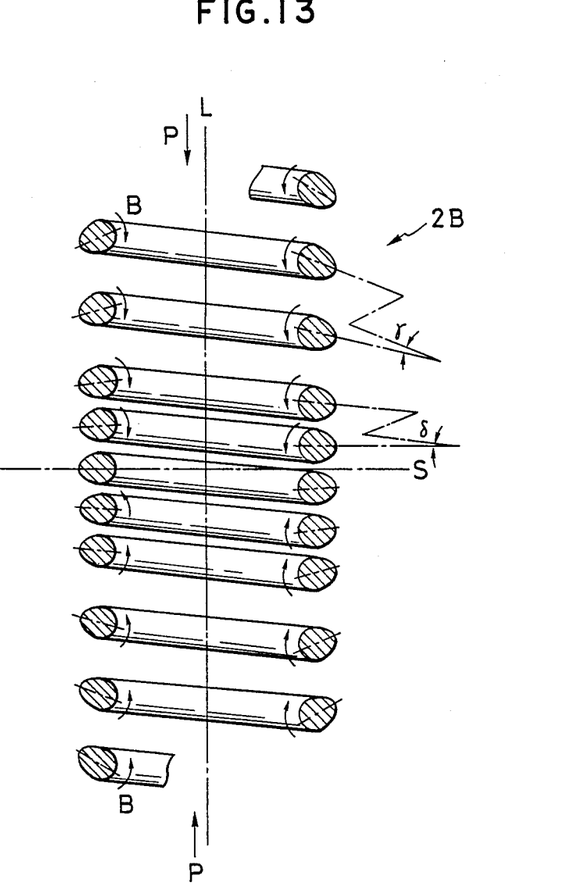
FIG. 13 is a partial longitudinal cross-section view showing a compression spring according to another preferred embodiment of the present invention.
Figure 14:
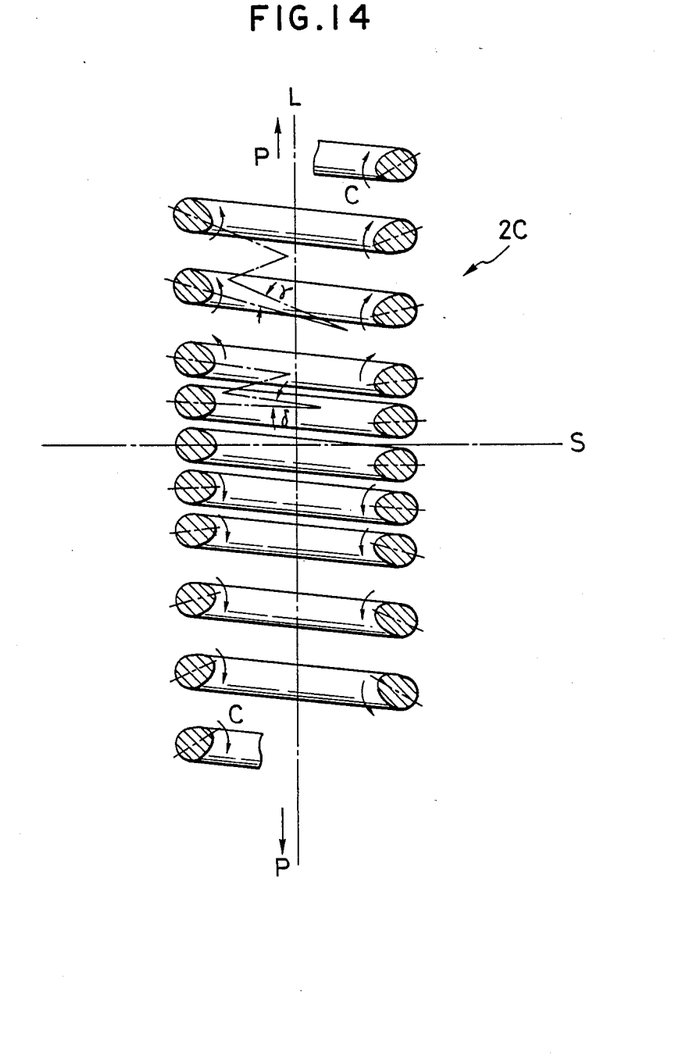
FIG. 14 is a partial longitudinal cross-section view showing a tension spring according to still another preferred embodiment of the present invention.

In a compression coil spring 2B shown in FIG. 13 also a coil spring inner circumferential surface side of the major diameter of the cross-section of the spring wire is deviated towards the free end side of the spring with reference to the extension/contraction reference plane S. However, this compression coil spring 2B is provided with a larger pitch portion where an angle of torsion per one pitch is represented by $\gamma$ and a smaller pitch portion where an angle of torsion per one pitch is represented by $\delta$, and upon unloading the angle of torsion $\gamma$ in the larger pitch portion is set larger than the angle of tortion $\delta$ in the smaller pitch portion. When a compression load P is applied to the compression coil spring 2B, the spring wire would be twisted in the direction shown by arrows B, and this angle of torsion caused by the compression load is large at the larger pitch portion and small at the smaller pitch portion. However, since a larger angle of torsion $\gamma$ is preliminarily given to the larger pitch portion and a small angle of torsion $\delta$ is given to the smaller pitch portion under a no-load condition as described above, under the loaded condition the angles of torsion $\gamma$ and $\delta$ at the larger pitch portion and the smaller pitch portion would both become zero or nearly zero. Therefore, in the compression coil spring 2B, upon application of a load the shearing stresses generated in the spring wire would be equalized along the lengthwise direction of the coil, and also the maximum shearing stress generated at the inner circumferential surface of the coil can be sufficiently reduced.

It is to be noted that in the compression coil spring 2A and 2B, as assisted by the fact that the spring wire has a flat non-circular cross-section shape, a collapsed height of the spring can be reduced. Therefore, these compression coil springs 2A and 2B are especially suitable for a coil spring to be used under a compressed condition rather than under an unloaded free height condition, such as a suspension spring for use in a vehicle.

While description has been made above in connection to compression coil springs, now description will be made on a tension coil spring. Since when a tension load is applied to a coil spring, the coil wire would be twisted in the opposite direction to the case where a compression load is applied, the angle of torsion ($\alpha$) generated in the spring wire by coiling in the case where the inclination angle ($\theta$) of the grooves of the respective feed roller pairs 3, 4 and 5 is made to be zero as shown in FIG. 10, is produced in a favorable direction for a tension coil spring. However, if the above-mentioned angle of torsion ($\alpha$) is too large as compared to the magnitude of the tension load exerted upon the tension coil spring, then even upon application of the tension load, torsion would remain in the spring wire, and hence the angle of torsion would not become zero or nearly zero. In order to make the angle of torsion upon application of a tension load to be zero or nearly zero, it is necessary to set the inclination angle ($\theta$) of the grooves of the respective feed roller pairs 3, 4 and 5 at a proper angle, for instance, at about 5°.

On the other hand, in a tension coil spring consisting of a larger pitch portion and a smaller pitch portion, since large torsion is generated at a larger pitch portion as compared to a smaller pitch portion upon application of a tension load, when the spring wire is shaped, even if the inclination angle ($\theta$) of the respective feed roller pairs 3, 4 and 5 is, for instance, 5° upon shaping the larger pitch portion, when the smaller pitch portion is shaped it is necessary to select the inclination angle ($\theta$) at a larger angle, for instance, at 15°.

A tension coil spring 2C according to the present invention that is one example of a tension coil spring formed under the above-mentioned condition, is shown in FIG. 14. FIG. 14 also shows a state of a coil spring when no load is applied thereto. In this tension coil spring 2C, the coil inner circumferential surface side of a major diameter of a cross-section of a spring wire is deviated by a proper torsion angle on the opposite side to the direction of application of a tension load indicated by arrows P with reference to the extension/contraction reference plane S, that is, on the side of the extension/contraction reference plane S. Reference character γ represents a torsion angle per one pitch at the larger pitch portion, and reference character δ represents a torsion angle per one pitch at the smaller pitch portion (γ>δ). If a tension load is applied to the tension coil spring 2C, torsional forces in the directions indicated by arrows C are exerted upon the spring wire, and the variation of the torsion angle γ or δ caused by the above-mentioned torsional forces is large at the larger pitch portion, and is small at the smaller pitch portion. Accordingly, the torsion angles γ and δ of the spring wire both become zero or nearly zero, as a result, the shearing stresses generated in the spring wire are equalized along the lengthwise direction of the coil spring, and also the maximum shearing stress generated at the coil inner circumferential surface can be sufficiently reduced.

Figure 15:
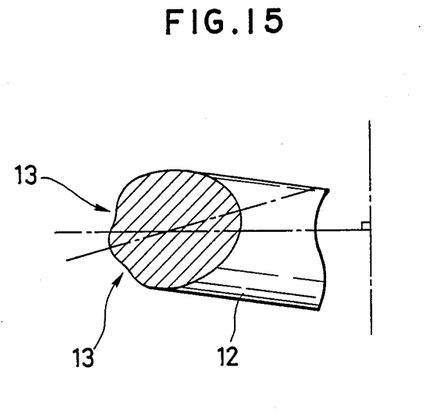
FIG. 15 is an enlarged cross-section showing a modification of a cross-section shape of a spring wire.

In a spring wire 12 shown in FIG. 15, similarly to the spring wires in the above-described respective embodiments, the basic cross-section shape is an oval shape consisting of a semi-circle and a semi-ellipse, but the semi-circle portion has recesses 13, 13. Advantages in the case of forming a coil spring according to the present to the present invention by making use of the spring wire 12, are that during the coiling work, the raw material wire can be surely gripped between feed rollers formed with conformed grooves (grooves having projections conformed with the recesses 13) so as not to rotate, and that it is possible to easily give a desired angle of torsion to the spring wire 12. Such an effect and advantage can be obtained, even if the recess 13 is provided only one or even if a flat cut plane is provided in place of the recess 13.

What is claimed is:

1. A coil spring having a center line, wherein a spring wire having a non-circular cross-section with a major diameter and a minor diameter is coiled into a spring configuration with said major diameter of said cross-section in a direction intersecting said center line of said spring; characterized in that said coil spring includes a preliminary torsion, applied to said spring wire when said coil spring is formed, such that a line parallel to said major diameter and a plane perpendicular to said center line form an angle facing said center line, wherein said parallel line forming a side of said angle is inclined toward a direction opposite to the direction of application of a load to be applied in use of said spring and the degree of said applied preliminary torsion is varied in said coil spring relative to a reference plane of extension and contraction of said coil spring.

2. A coil spring as claimed in claim 1, wherein said coil spring comprises a larger pitch portion and a smaller pitch portion, and said preliminary torsion applied to said larger pitch portion is larger than said preliminary torsion applied to said smaller pitch portion.

3. A coil spring as claimed in claim 1 or 2, wherein said load to be applied in use of said spring is a compression load.

4. A coil spring as claimed in claim 1 or 2, wherein said load to be applied in use of said spring is a tension load.

* * * * *